US008910905B2

(12) United States Patent
DeVaul et al.

(10) Patent No.: US 8,910,905 B2
(45) Date of Patent: Dec. 16, 2014

(54) COMBINED BALLOON SHIPPING CONTAINER AND DEPLOYMENT SYSTEM

(75) Inventors: Richard Wayne DeVaul, Mountain View, CA (US); Eric Teller, Palo Alto, CA (US); Clifford L. Biffle, Berkeley, CA (US); Joshua Weaver, San Jose, CA (US); Brad Rhodes, Alameda, CA (US)

(73) Assignee: Google Inc., Mountain View, CA (US)

( * ) Notice: Subject to any disclaimer, the term of this patent is extended or adjusted under 35 U.S.C. 154(b) by 26 days.

(21) Appl. No.: 13/570,054

(22) Filed: Aug. 8, 2012

(65) Prior Publication Data

US 2014/0042042 A1 Feb. 13, 2014

(51) Int. Cl.
*B64B 1/40* (2006.01)
*B64B 1/58* (2006.01)
*B64F 1/04* (2006.01)

(52) U.S. Cl.
CPC ............. *B64B 1/40* (2013.01); *B64C 2201/122* (2013.01); *B64C 2201/201* (2013.01); *B64B 1/58* (2013.01); *B64C 2201/22* (2013.01); *B64F 1/04* (2013.01)
USPC .................................. 244/63; 244/31; 244/98

(58) Field of Classification Search
CPC ............... B64B 1/40; B64B 1/58; B64F 1/04; B64C 2201/22; B64C 2201/201; B64C 2201/122; B64C 2201/126

USPC .......... 244/63, 24, 30–33, 96, 98, 116, 110 E, 244/100 A, 107; 116/210, DIG. 8, DIG. 9; 114/261, 262, 322, 326, 328; 441/30, 441/31

See application file for complete search history.

(56) References Cited

U.S. PATENT DOCUMENTS

| 2,635,834 | A | | 4/1953 | Huch |
| 4,416,433 | A | | 11/1983 | Bellina |
| 5,108,337 | A | | 4/1992 | Sloan et al. |
| 5,636,480 | A | * | 6/1997 | Lauritsen et al. ............... 244/33 |
| 7,356,390 | B2 | * | 4/2008 | Knoblach et al. ............... 244/31 |
| 8,061,648 | B2 | | 11/2011 | Lachenmeier |
| 2004/0059476 | A1 | * | 3/2004 | Nichols ........................... 701/21 |
| 2006/0137348 | A1 | * | 6/2006 | Pas ................................. 60/641.1 |
| 2010/0060093 | A1 | * | 3/2010 | Hunter ............................. 310/89 |
| 2013/0007935 | A1 | * | 1/2013 | Chin et al. ....................... 244/63 |

OTHER PUBLICATIONS

Hebert et al., Statutory Invention Registration, Floating Platform for Remote Basing, US H2254 H, Jun. 7, 2011.

* cited by examiner

*Primary Examiner* — Timothy D Collins
*Assistant Examiner* — Richard R Green
(74) *Attorney, Agent, or Firm* — McDonnell Boehnen Hulbert & Berghoff LLP

(57) ABSTRACT

Disclosed embodiments relate to a combined shipping container and balloon deployment system for deploying balloons into a balloon network. Such a shipping container may allow one or more balloons to be transported to a desired launch location, and then launched directly from the shipping container.

21 Claims, 10 Drawing Sheets

US 8,910,905 B2

COMBINED BALLOON SHIPPING CONTAINER AND DEPLOYMENT SYSTEM

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

In one aspect, a system includes: (a) a shipping container that is closable to enclose a balloon, wherein the balloon comprises an envelope and a payload; (b) a communication interface that is operable to receive a launch instruction; (c) a balloon-deployment system coupled to the shipping container, wherein the balloon-deployment system is operable to open the shipping container for deployment of the balloon; and (d) a control system coupled to the shipping container, wherein the control system is operable to respond to the launch instruction by causing balloon-deployment system to open the shipping container and launch the balloon from the open shipping container.

In another aspect, a system includes: (a) a shipping container for a balloon, wherein the balloon comprises an envelope and a payload; (b) a balloon-deployment system coupled to the shipping container, wherein the balloon-deployment system is operable to deploy the balloon; and (c) a control system coupled to the shipping container, wherein the control system is operable to respond to the launch instruction by causing balloon-deployment system to launch the balloon from the shipping container for operation in a balloon network.

In a further aspect, a system includes: (a) a shipping container for a balloon, wherein the balloon comprises an envelope and a payload; (b) a balloon-deployment system coupled to the shipping container, wherein the balloon-deployment system is operable to deploy the balloon; and (c) a control system coupled to the shipping container, wherein the control system is operable to: (i) detect a launch event; and (ii) in response to detection of the launch event, operate the balloon-deployment system to deploy the balloon from the shipping container for operation in a balloon network.

These as well as other aspects, advantages, and alternatives, will become apparent to those of ordinary skill in the art by reading the following detailed description, with reference where appropriate to the accompanying drawings.

DETAILED DESCRIPTION

Figure 1A:
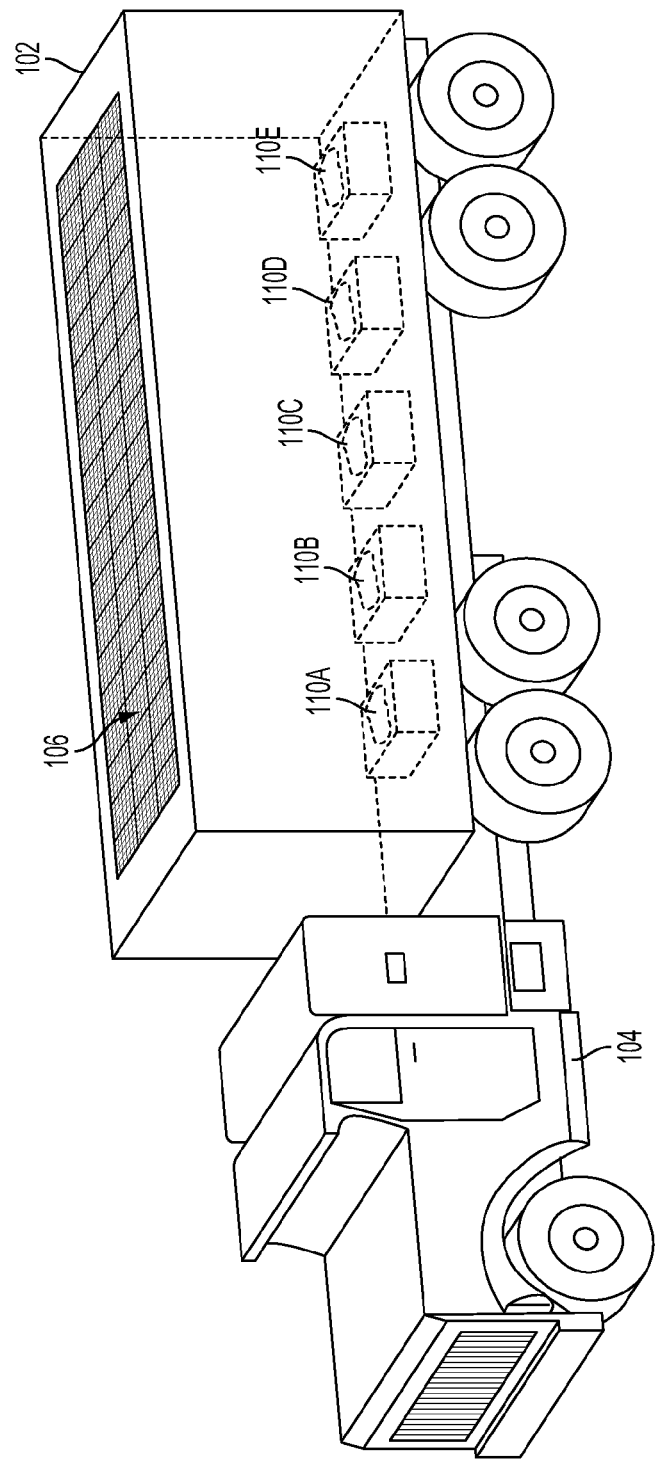
FIG. 1A is an illustration of a shipping container for balloons, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. Overview

Example embodiments may be implemented in a data network that includes a plurality of balloons; for example, a mesh network formed by high-altitude balloons deployed in the stratosphere. Since winds in the stratosphere may affect the locations of the balloons in a differential manner, each balloon in an example network may be configured to change its horizontal position by adjusting its vertical position (i.e., altitude). For instance, by adjusting its altitude, a balloon may be able find winds that will carry it horizontally (e.g., latitudinally and/or longitudinally) to a desired horizontal location.

In an exemplary balloon network, balloons may move latitudinally and/or longitudinally relative to one another so as to form a desired topology. However, keeping an individual balloon at a specific location may be difficult due to winds, and possibly for other reasons as well. Accordingly, the desired topology may define a relative framework and/or rules for positioning of balloons relative to one another, such that balloons can move with respect to the ground, while maintaining the desired topology. Thus, at a given location on earth, the particular balloon or balloons that provide service may change over time.

Further, there may be scenarios where balloons need to be quickly deployed in an area. For example, if a natural disaster occurs in an area, additional balloons may be deployed in the area to help with response, rescue, and/or recovery efforts, for example. Further, in these and other scenarios, it may be desirable to deploy balloons automatically, with little to no human effort, or to at least have balloons that can be deployed by individuals with little to no technical knowledge of the balloons or launch systems for the balloons. Yet further, it may be desirable to package such balloons so that they can be quickly and readily transported to a desired location, and can be easily deployed upon arrival at the desired location.

Accordingly, example embodiments may provide a shipping container for balloons with an integrated and automatic deployment system, which can be easily shipped through existing shipping infrastructure. As such, a balloon may be transported to a desired location in the shipping container and then launched directly from the shipping container. Further, the shipping container may include a communication system such that deployment may be initiated via a remote instruction. In addition, the shipping container may include self-supporting power systems (e.g., that make use of renewable energy sources), such as a solar power system and/or a wind-power system, in order to operate components within the shipping container, such as a balloon deployment system and/or a communication system. Further, in order to maintain power over long periods of time when renewable sources of energy may not be usable to provide enough power, the system might utilize a generator and a high-density form of energy such as gas or a hydrogen fuel cell. Other types of power systems are also possible.

To illustrate one possible application of an example embodiment, consider an area in the United States where a flood has occurred and requires significant relief efforts, but has damaged much of the existing communication infrastructure (e.g., wired data networks, telephone networks) and caused power outages throughout the area. A shipping container of a standard size (e.g., a twenty-foot or forty-foot shipping container) may be configured with a deployment system (or possibly multiple deployment systems) for a number of balloons that are enclosed in the shipping container and transported to the area affected by the flood. For instance, FIG. 1A is an illustration of a shipping container 102 for balloons 110A to 110E, according to an example embodiment. The shipping container 102 is of a standard size, such that it can be loaded onto a flatbed truck 104 for shipment to a desired location, such as the area affected by the flood.

Figure 1B:
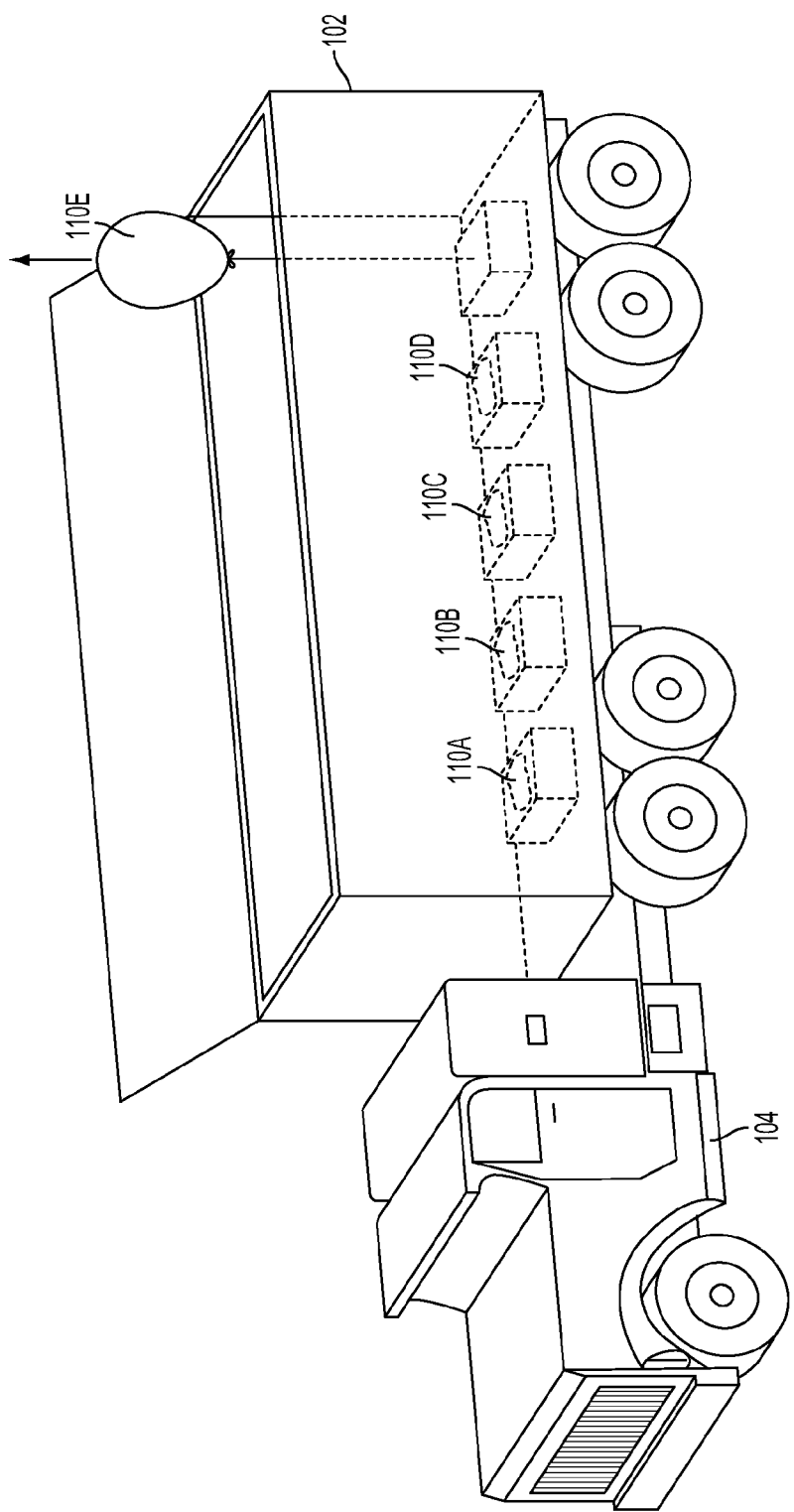
FIG. 1B is an illustration of the shipping container for balloons while the balloons are being deployed from the shipping container, according to an example embodiment.

Further, shipping container 102 may include a solar-power system 106 that generates power for balloon-deployment systems and communications systems included in the shipping container 102. As such, an operator at a remote location may operate the balloon-deployment system (and possibly other systems associated with the balloons), and deploy the balloons into the balloon network after they have been transported near to the flooded area. For example, FIG. 1B is an illustration of the shipping container 102 for balloons while balloons 110A to 110E are being deployed from the shipping container, according to an example embodiment. By allowing for rapid distribution and remote deployment of balloons from a shipping container, balloon-network may be quickly added to an area when needed.

Note that some embodiments may allow for a balloon to be launched while its shipping container is moving or while the shipping container is stationary. For example, balloons could be launched from shipping container 102 while flatbed truck is moving. Other examples are possible as well.

It should be understood that the above application is but one of many possible applications of an example system. Further, an example system may be utilized in many other scenarios.

Before describing more details of an example system, example balloon networks will be described below.

2. Example Balloon Networks

In some embodiments, a high-altitude-balloon network may be homogenous. That is, the balloons in a high-altitude-balloon network could be substantially similar to each other in one or more ways. More specifically, in a homogenous high-altitude-balloon network, each balloon is configured to communicate with nearby balloons via free-space optical links. Further, some or all of the balloons in such a network, may also be configured communicate with ground-based station(s) using RF communications. (Note that in some embodiments, the balloons may be homogenous in so far as each balloon is configured for free-space optical communication with other balloons, but heterogeneous with regard to RF communications with ground-based stations.)

In other embodiments, a high-altitude-balloon network may be heterogeneous, and thus may include two or more different types of balloons. For example, some balloons may be configured as super-nodes, while other balloons may be configured as sub-nodes. Some balloons may be configured to function as both a super-node and a sub-node. Such balloons may function as either a super-node or a sub-node at a particular time, or, alternatively, act as both simultaneously depending on the context. For instance, an example balloon could aggregate search requests of a first type to transmit to a ground-based station. The example balloon could also send search requests of a second type to another balloon, which could act as a super-node in that context.

In such a configuration, the super-node balloons may be configured to communicate with nearby super-node balloons via free-space optical links However, the sub-node balloons may not be configured for free-space optical communication, and may instead be configured for some other type of communication, such as RF communications. In that case, a super-node may be further configured to communicate with sub-nodes using RF communications. Thus, the sub-nodes may relay communications between the super-nodes and one or more ground-based stations using RF communications. In this way, the super-nodes may collectively function as back-haul for the balloon network, while the sub-nodes function to relay communications from the super-nodes to ground-based stations. Other differences could be present between balloons in a heterogeneous balloon network.

Figure 2:
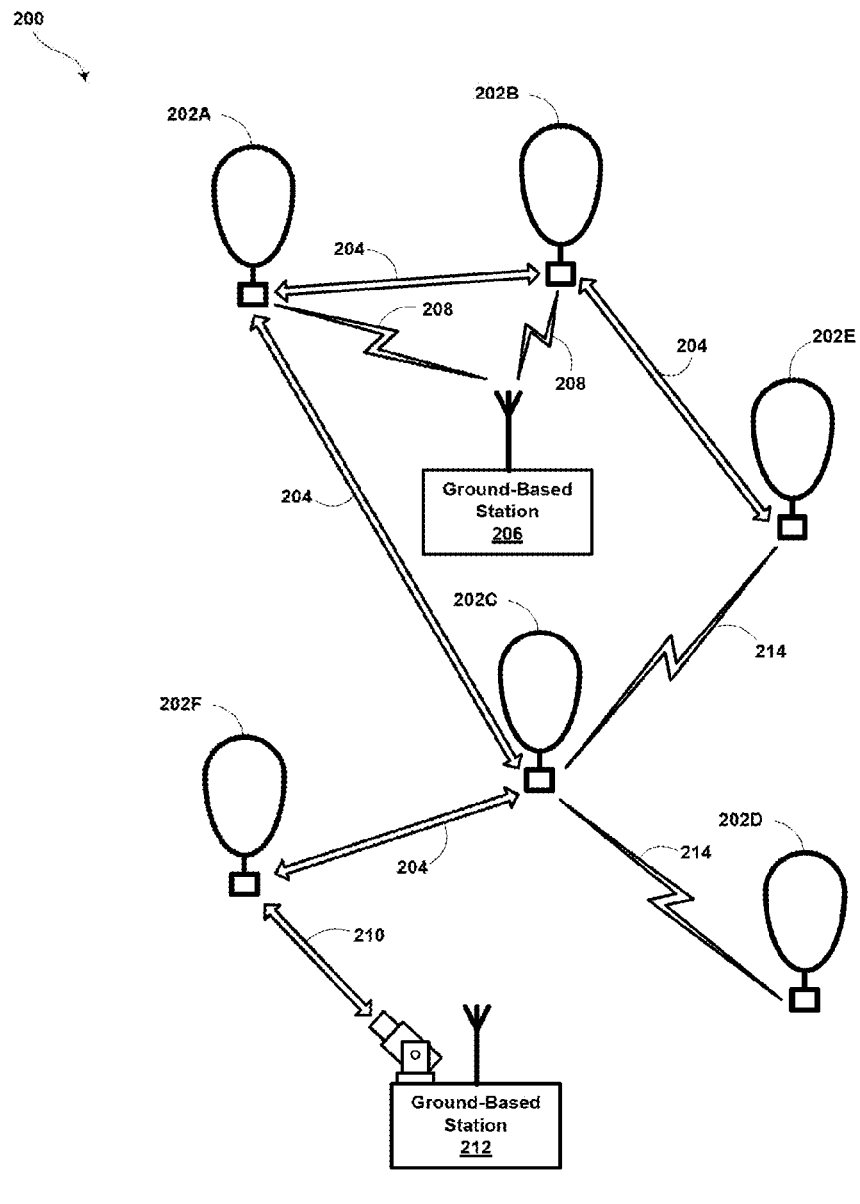
FIG. 2 is a simplified block diagram illustrating a balloon network, according to an example embodiment.

FIG. 2 is a simplified block diagram illustrating a balloon network 200, according to an example embodiment. As shown, balloon network 200 includes balloons 202A to 202F, which are configured to communicate with one another via free-space optical links 204. Balloons 202A to 202F could additionally or alternatively be configured to communicate with one another via RF links 214. Balloons 202A to 202F may collectively function as a mesh network for packet-data communications. Further, balloons 202A to 202F may be configured for RF communications with ground-based stations 206 and 212 via RF links 208. In another example embodiment, balloons 202A to 202F could be configured to communicate via optical link 210 with ground-based station 212.

In an example embodiment, balloons 202A to 202F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an example embodiment, high-altitude balloons may be generally configured to operate in an altitude range within the stratosphere that has lower winds (e.g., between 5 and 20 miles per hour (mph)).

More specifically, in a high-altitude-balloon network, balloons 202A to 202F may generally be configured to operate at altitudes between 17 km and 25 km (although other altitudes are possible). This altitude range may be advantageous for several reasons. In particular, this layer of the stratosphere generally has mild wind and turbulence (e.g., winds between 5 and 20 miles per hour (mph)). Further, while the winds between 17 km and 25 km may vary with latitude and by season, the variations can be modelled in a reasonably accurate manner. Additionally, altitudes above 17 km are typically above the maximum flight level designated for commercial air traffic. Therefore, interference with commercial flights is not a concern when balloons are deployed between 17 km and 25 km.

To transmit data to another balloon, a given balloon 202A to 202F may be configured to transmit an optical signal via an optical link 204. In an example embodiment, a given balloon 202A to 202F may use one or more high-power light-emitting diodes (LEDs) to transmit an optical signal. Alternatively, some or all of balloons 202A to 202F may include laser systems for free-space optical communications over optical links 204. Other types of free-space optical communication are possible. Further, in order to receive an optical signal from another balloon via an optical link 204, a given balloon 202A to 202F may include one or more optical receivers. Additional details of example balloons are discussed in greater detail below, with reference to FIG. 3.

In a further aspect, balloons 202A to 202F may utilize one or more of various different RF air-interface protocols for communication ground-based stations 206 and 212 via RF links 208. For instance, some or all of balloons 202A to 202F may be configured to communicate with ground-based stations 206 and 212 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-to-ground RF communication, among other possibilities.

In a further aspect, there may scenarios where RF links 208 do not provide a desired link capacity for balloon-to-ground communications. For instance, increased capacity may be desirable to provide backhaul links from a ground-based gateway, and in other scenarios as well. Accordingly, an example network may also include downlink balloons, which could provide a high-capacity air-ground link.

For example, in balloon network 200, balloon 202F could be configured as a downlink balloon. Like other balloons in an example network, a downlink balloon 202F may be operable for optical communication with other balloons via optical links 204. However, downlink balloon 202F may also be configured for free-space optical communication with a ground-based station 212 via an optical link 210. Optical link 210 may therefore serve as a high-capacity link (as compared to an RF link 208) between the balloon network 200 and a ground-based station 212.

Note that in some implementations, a downlink balloon 202F may additionally be operable for RF communication with ground-based stations 206. In other cases, a downlink balloon 202F may only use an optical link for balloon-to-ground communications. Further, while the arrangement shown in FIG. 2 includes just one downlink balloon 202F, an example balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which provides an RF link with substantially the same capacity as the optical links 204. Other forms are also possible.

Balloons could be configured to establish a communication link with space-based satellites in addition to, or as an alternative to, a ground-based communication link.

Ground-based stations, such as ground-based stations 206 and/or 212, may take various forms. Generally, a ground-based station may include components such as transceivers, transmitters, and/or receivers for communication via RF links and/or optical links with a balloon network. Further, a ground-based station may use various air-interface protocols in order communicate with a balloon 202A to 202F over an RF link 208. As such, ground-based stations 206 and 212 may be configured as an access point with which various devices can connect to balloon network 200. Ground-based stations 206 and 212 may have other configurations and/or serve other purposes without departing from the scope of the invention.

Further, some ground-based stations, such as ground-based stations 206 and 212, may be configured as gateways between balloon network 200 and one or more other networks. Such ground-based stations 206 and 212 may thus serve as an interface between the balloon network and the Internet, a cellular service provider's network, and/or other types of networks. Variations on this configuration and other configurations of ground-based stations 206 and 212 are also possible.

2a) Mesh Network Functionality

As noted, balloons 202A to 202F may collectively function as a mesh network. More specifically, since balloons 202A to 202F may communicate with one another using free-space optical links, the balloons may collectively function as a free-space optical mesh network.

In a mesh-network configuration, each balloon 202A to 202F may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 202A to 202F may employ various routing techniques and self-healing algorithms. In some embodiments, a balloon network 200 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 202A to 202F move relative to one another and/or relative to the ground. Accordingly, an example balloon network 200 may apply a mesh protocol to update the state of the network as the topology of the network changes. For example, to address the mobility of the balloons 202A to 202F, balloon network 200 may employ and/or adapt various techniques that are employed in mobile ad hoc networks (MANETs). Other examples are possible as well.

In some implementations, a balloon network 200 may be configured as a transparent mesh network. More specifically, in a transparent balloon network, the balloons may include components for physical switching that is entirely optical, without any electrical involved in physical routing of optical signals. Thus, in a transparent configuration with optical switching, signals travel through a multi-hop lightpath that is entirely optical.

In other implementations, the balloon network 200 may implement a free-space optical mesh network that is opaque. In an opaque configuration, some or all balloons 202A to 202F may implement optical-electrical-optical (OEO) switching. For example, some or all balloons may include optical cross-connects (OXCs) for OEO conversion of optical signals. Other opaque configurations are also possible. Additionally, network configurations are possible that include routing paths with both transparent and opaque sections.

In a further aspect, balloons in an example balloon network 200 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath. Alternatively, optical wavelength conversion could take place at only selected hops along the lightpath.

Further, various routing algorithms may be employed in an opaque configuration. For example, to determine a primary lightpath and/or one or more diverse backup lightpaths for a given connection, example balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular Quality of Service (QoS) may be employed when determining a lightpath. Other techniques are also possible.

2b) Station-Keeping Functionality

In an example embodiment, a balloon network 200 may implement station-keeping functions to help provide a desired network topology. For example, station-keeping may involve each balloon 202A to 202F maintaining and/or moving into a certain position relative to one or more other balloons in the network (and possibly in a certain position relative to the ground). As part of this process, each balloon 202A to 202F may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such cases, a given balloon 202A to 202F may implement station-keeping functions to position itself at substantially the same distance (or within a certain range of distances) from adjacent balloons in the balloon network 200.

In other cases, a balloon network 200 may have a non-uniform topology. For instance, example embodiments may involve topologies where balloons area distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an example balloon network may be adaptable. In particular, station-keeping functionality of example balloons may allow the balloons to adjust their respective positioning in accordance with a change in the desired topology of the network. For example, one or more balloons could move to new positions to increase or decrease the density of balloons in a given area. Other examples are possible.

In some embodiments, a balloon network 200 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function. The given balloon may then determine appropriate actions to take in order to effectuate the desired movement. For example, a balloon may determine an altitude adjustment or adjustments such that winds will move the balloon in the desired manner.

2c) Control of Balloons in a Balloon Network

Figure 3:
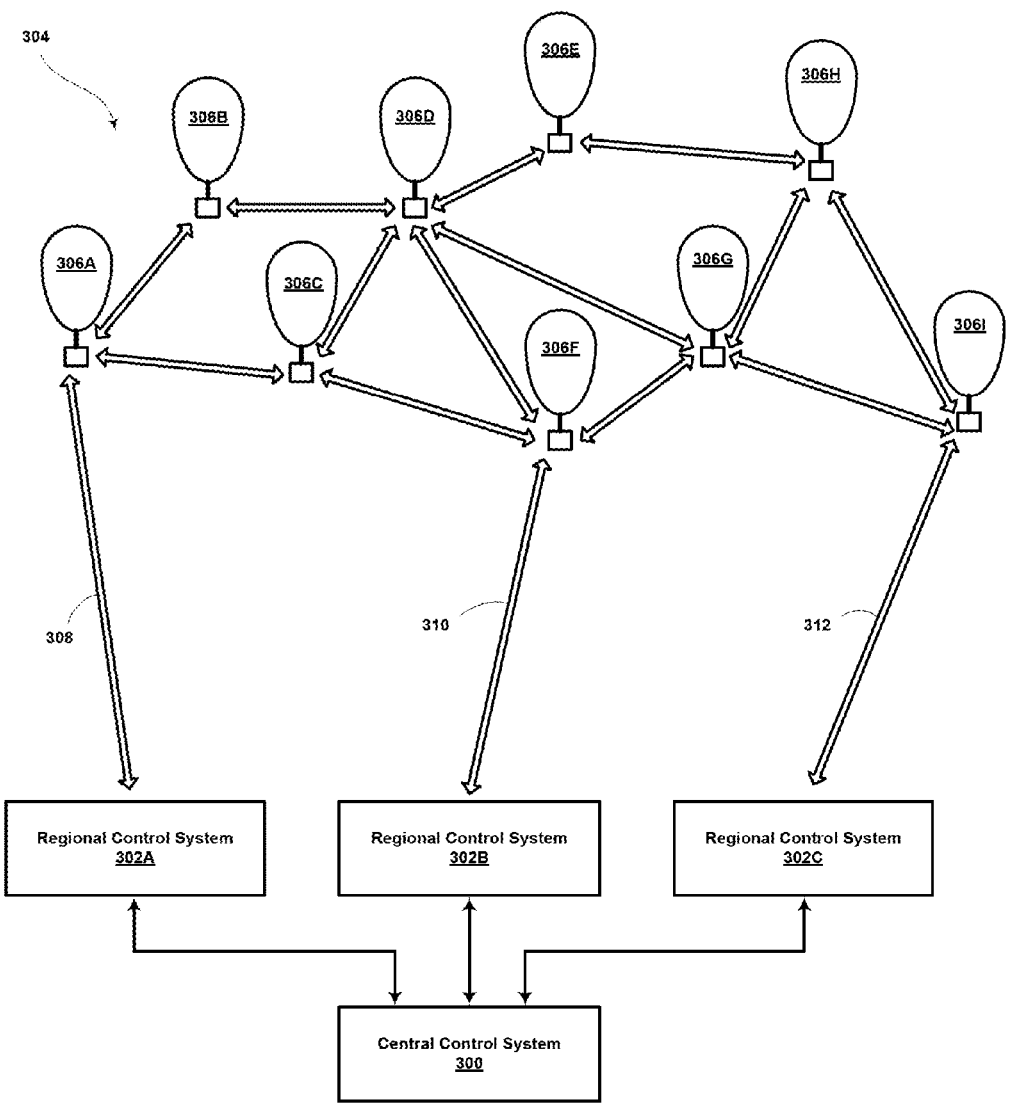
FIG. 3 is a block diagram illustrating a balloon-network control system, according to an example embodiment.

In some embodiments, mesh networking and/or station-keeping functions may be centralized. For example, FIG. 3 is a block diagram illustrating a balloon-network control system, according to an example embodiment. In particular, FIG. 3 shows a distributed control system, which includes a central control system 300 and a number of regional control-systems 302A to 302B. Such a control system may be configured to coordinate certain functionality for balloon network 304, and as such, may be configured to control and/or coordinate certain functions for balloons 306A to 306I.

In the illustrated embodiment, central control system 300 may be configured to communicate with balloons 306A to 306I via number of regional control systems 302A to 302C. These regional control systems 302A to 302C may be configured to receive communications and/or aggregate data from balloons in the respective geographic areas that they cover, and to relay the communications and/or data to central control system 300. Further, regional control systems 302A to 302C may be configured to route communications from central control system 300 to the balloons in their respective geographic areas. For instance, as shown in FIG. 2, regional control system 302A may relay communications and/or data between balloons 306A to 306C and central control system 300, regional control system 302B may relay communications and/or data between balloons 306D to 306F and central control system 300, and regional control system 302C may relay communications and/or data between balloons 306G to 306I and central control system 300.

In order to facilitate communications between the central control system 300 and balloons 306A to 306I, certain balloons may be configured as downlink balloons, which are operable to communicate with regional control systems 302A to 302C. Accordingly, each regional control system 302A to 302C may be configured to communicate with the downlink balloon or balloons in the respective geographic area it covers. For example, in the illustrated embodiment, balloons 306A, 306F, and 306I are configured as downlink balloons. As such, regional control systems 302A to 302C may respectively communicate with balloons 306A, 306F, and 306I via optical links 306, 308, and 310, respectively.

In the illustrated configuration, where only some of balloons 306A to 306I are configured as downlink balloons, the balloons 306A, 306F, and 306I that are configured as downlink balloons may function to relay communications from central control system 300 to other balloons in the balloon network, such as balloons 306B to 306E, 306G, and 306H.

However, it should be understood that it in some implementations, it is possible that all balloons may function as downlink balloons. Further, while FIG. 3 shows multiple balloons configured as downlink balloons, it is also possible for a balloon network to include only one downlink balloon.

Note that a regional control system 302A to 302C may in fact just be particular type of ground-based station that is configured to communicate with downlink balloons (e.g. the ground-based station 212 of FIG. 2). Thus, while not shown in FIG. 3, a control system may be implemented in conjunction with other types of ground-based stations (e.g., access points, gateways, etc.).

In a centralized control arrangement, such as that shown in FIG. 3, the central control system 300 (and possibly regional control systems 302A to 302C as well) may coordinate certain mesh-networking functions for balloon network 304. For example, balloons 306A to 306I may send the central control system 300 certain state information, which the central control system 300 may utilize to determine the state of balloon network 304. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 300 may aggregate state information from some or all the balloons 306A to 306I in order to determine an overall state of the network.

The overall state of the network may then be used to coordinate and/or facilitate certain mesh-networking functions such as determining lightpaths for connections. For example, the central control system 300 may determine a current topology based on the aggregate state information from some or all the balloons 306A to 306I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 304.

In a further aspect, the central control system 300 (and possibly regional control systems 302A to 302C as well) may also coordinate certain station-keeping functions for balloon network 304. For example, the central control system 300 may input state information that is received from balloons 306A to 306I to an energy function, which may effectively compare the current topology of the network to a desired topology, and provide a vector indicating a direction of movement (if any) for each balloon, such that the balloons can move towards the desired topology. Further, the central control system 300 may use altitudinal wind data to determine respective altitude adjustments that may be initiated to achieve the movement towards the desired topology. The central control system 300 may provide and/or support other station-keeping functions as well.

FIG. 3 shows a distributed arrangement that provides centralized control, with regional control systems 302A to 302C coordinating communications between a central control system 300 and a balloon network 304. Such an arrangement may be useful to provide centralized control for a balloon network that covers a large geographic area. In some embodiments, a distributed arrangement may even support a global balloon network that provides coverage everywhere on earth. A distributed-control arrangement may be useful in other scenarios as well.

Further, it should be understood that other control-system arrangements are possible. For instance, some implementations may involve a centralized control system with additional layers (e.g., sub-region systems within the regional control systems, and so on). Alternatively, control functions may be provided by a single, centralized, control system, which communicates directly with one or more downlink balloons.

In some embodiments, control and coordination of a balloon network may be shared between a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 300 and/or regional control systems 302A to 302C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

As an example, each balloon A may receive distance information $d_1$ to $d_k$ with respect to each of its k closest neighbors. Each balloon A may treat the distance to each of the k balloons as a virtual spring with vector representing a force direction from the first nearest neighbor balloon i toward balloon A and with force magnitude proportional to $d_i$. The balloon A may sum each of the k vectors and the summed vector is the vector of desired movement for balloon A. Balloon A may attempt to achieve the desired movement by controlling its altitude.

Alternatively, this process could assign the force magnitude of each of these virtual forces equal to $d_i \times d_j$, wherein $d_j$ is proportional to the distance to the second nearest neighbor balloon, for instance.

In another embodiment, a similar process could be carried out for each of the k balloons and each balloon could transmit its planned movement vector to its local neighbors. Further rounds of refinement to each balloon's planned movement vector can be made based on the corresponding planned movement vectors of its neighbors. It will be evident to those skilled in the art that other algorithms could be implemented in a balloon network in an effort to maintain a set of balloon spacings and/or a specific network capacity level over a given geographic location.

2d) Example Balloon Configuration

Figure 4:
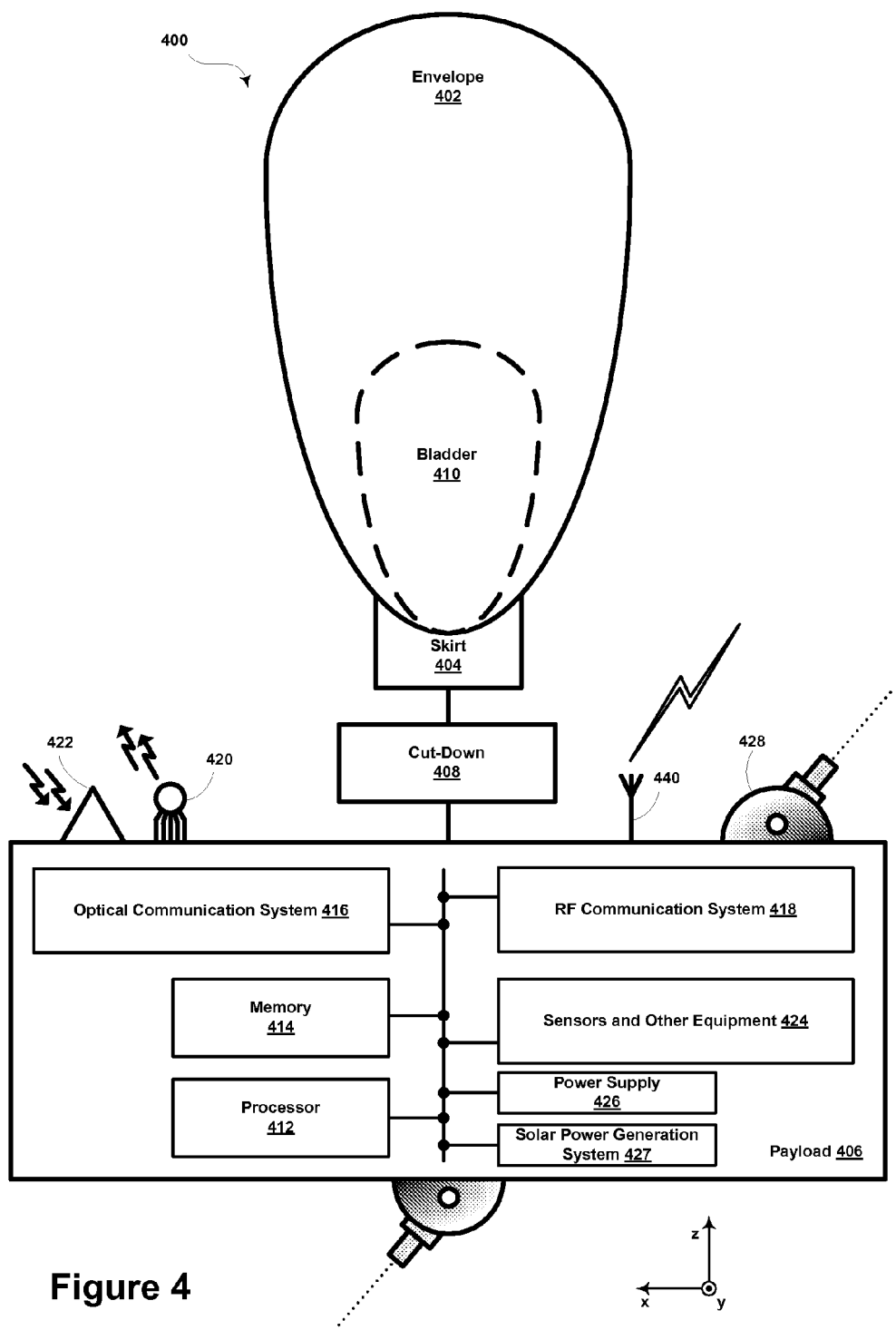
FIG. 4 is a simplified block diagram illustrating a high-altitude balloon, according to an example embodiment.

Various types of balloon systems may be incorporated in an example balloon network. As noted above, an example embodiment may utilize high-altitude balloons, which could typically operate in an altitude range between 17 km and 25 km. FIG. 4 shows a high-altitude balloon 400, according to an example embodiment. As shown, the balloon 400 includes an envelope 402, a skirt 404, a payload 406, and a cut-down system 408, which is attached between the balloon 402 and payload 406.

The envelope 402 and skirt 404 may take various forms, which may be currently well-known or yet to be developed. For instance, the envelope 402 and/or skirt 404 may be made of a highly-flexible latex material or may be made of a rubber material such as chloroprene. In one example embodiment, the envelope and/or skirt could be made of metalized Mylar or BoPet. Other materials are also possible. Further, the shape and size of the envelope 402 and skirt 404 may vary depending upon the particular implementation. Additionally, the envelope 402 may be filled with various different types of gases, such as helium and/or hydrogen. Other types of gases are possible as well.

The payload 406 of balloon 400 may include a processor 412 and on-board data storage, such as memory 414. The memory 414 may take the form of or include a non-transitory computer-readable medium. The non-transitory computer-readable medium may have instructions stored thereon, which can be accessed and executed by the processor 412 in order to carry out the balloon functions described herein.

The payload 406 of balloon 400 may also include various other types of equipment and systems to provide a number of different functions. For example, payload 406 may include optical communication system 416, which may transmit optical signals via an ultra-bright LED system 420, and which may receive optical signals via an optical-communication receiver 422 (e.g., a photodiode receiver system). Further, payload 406 may include an RF communication system 418, which may transmit and/or receive RF communications via an antenna system 440.

The optical communication system 416 and/or the RF communication system 418 are examples of communication systems that may include communication interfaces for communications between a balloon and other nodes in a balloon network. It should be understood that other types of communication systems that provide other types of communication interfaces are also possible, and may vary depending upon the particular network implementation.

The payload 406 may also include a power supply 426 to supply power to the various components of balloon 400. The power supply 426 could include a rechargeable battery. In other embodiments, the power supply 426 may additionally or alternatively represent other means known in the art for producing power. In addition, the balloon 400 may include a solar power generation system 427. The solar power generation system 427 may include solar panels and could be used to generate power that charges and/or is distributed by power supply 426.

Further, payload 406 may include various types of other systems and sensors 428. For example, payload 406 may include one or more video and/or still cameras, a GPS system, various motion sensors (e.g., accelerometers, magnetometers, gyroscopes, and/or compasses), and/or various sensors for capturing environmental data. Further, some or all of the components within payload 406 may be implemented in a radiosonde or other probe, which may be operable to measure, e.g., pressure, altitude, geographical position (latitude and longitude), temperature, relative humidity, and/or wind speed and/or wind direction, among other information.

As noted, balloon 400 includes an ultra-bright LED system 420 for free-space optical communication with other balloons. As such, optical communication system 416 may be configured to transmit a free-space optical signal by modulating the ultra-bright LED system 420. The optical communication system 416 may be implemented with mechanical systems and/or with hardware, firmware, and/or software. Generally, the manner in which an optical communication system is implemented may vary, depending upon the particular application. The optical communication system 416 and other associated components are described in further detail below. Note that in some embodiments, a balloon may include a laser system for free-space optical communications instead of or in addition to ultra-bright LED system 420.

In a further aspect, balloon 400 may be configured for altitude control. For instance, balloon 400 may include a variable buoyancy system, which is configured to change the altitude of the balloon 400 by adjusting the volume and/or density of the gas in the balloon 400. A variable buoyancy system may take various forms, and may generally be any system that can change the volume and/or density of gas in the envelope 402.

In an example embodiment, a variable buoyancy system may include a bladder 410 that is located inside of envelope 402. The bladder 410 could be an elastic chamber configured to hold liquid and/or gas. Alternatively, the bladder 410 need not be inside the envelope 402. For instance, the bladder 410 could be a ridged bladder that could be pressurized well beyond neutral pressure. The buoyancy of the balloon 400 may therefore be adjusted by changing the density and/or volume of the gas in bladder 410. To change the density in bladder 410, balloon 400 may be configured with systems and/or mechanisms for heating and/or cooling the gas in bladder 410. Further, to change the volume, balloon 400 may include pumps or other features for adding gas to and/or removing gas from bladder 410. Additionally or alternatively, to change the volume of bladder 410, balloon 400 may include release valves or other features that are controllable to allow gas to escape from bladder 410. Multiple bladders 410 could be implemented within the scope of this disclosure. For instance, multiple bladders could be used to improve balloon stability.

In an example embodiment, the envelope 402 could be filled with helium, hydrogen or other lighter-than-air material. The envelope 402 could thus have an associated upward buoyancy force. In such an embodiment, air in the bladder 410 could be considered a ballast tank that may have an associated downward ballast force. In another example embodiment, the amount of air in the bladder 410 could be changed by pumping air (e.g., with an air compressor) into and out of the bladder 410. By adjusting the amount of air in the bladder 410, the ballast force may be controlled. In some embodiments, the ballast force may be used, in part, to counteract the buoyancy force and/or to provide altitude stability.

In another embodiment, a portion of the envelope 402 could be a first color (e.g., black) and/or a first material from the rest of envelope 402, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 402 as well as the gas inside the envelope 402. In this way, the buoyancy force of the envelope 402 may increase. By rotating the balloon such that the second material is facing the sun, the temperature of gas inside the envelope 402 may decrease. Accordingly, the buoyancy force may decrease. In this manner, the buoyancy force of the balloon could be adjusted by changing the temperature/volume of gas inside the envelope 402 using solar energy. In such embodiments, it is possible that a bladder 410 may not be a necessary element of balloon 400. Thus, various contemplated embodiments, altitude control of balloon 400 could be achieved, at least in part, by adjusting the rotation of the balloon with respect to the sun.

Further, a balloon 406 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location. Alternatively, the altitudinal adjustments may be computed by a ground-based or satellite-based control system and communicated to the high-altitude balloon. In other embodiments, specific balloons in a heterogeneous balloon network may be configured to compute altitudinal adjustments for other balloons and transmit the adjustment commands to those other balloons.

As shown, the balloon 400 also includes a cut-down system 408. The cut-down system 408 may be activated to separate the payload 406 from the rest of balloon 400. The cut-down system 408 could include at least a connector, such as a balloon cord, connecting the payload 406 to the envelope 402 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 406 away from the envelope 402.

The cut-down functionality may be utilized anytime the payload needs to be accessed on the ground, such as when it is time to remove balloon 400 from a balloon network, when maintenance is due on systems within payload 406, and/or when power supply 426 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it does not need to be accessed on the ground. In other embodiments, in-flight balloons may be serviced by specific service balloons or another type of aerostat or aircraft.

3. Balloon Network with Optical and RF Links Between Balloons

In some embodiments, a high-altitude-balloon network may include super-node balloons, which communicate with one another via optical links, as well as sub-node balloons, which communicate with super-node balloons via RF links. Generally, the optical links between super-node balloons may be configured to have more bandwidth than the RF links between super-node and sub-node balloons. As such, the super-node balloons may function as the backbone of the balloon network, while the sub-nodes may provide sub-networks providing access to the balloon network and/or connecting the balloon network to other networks.

Figure 5:
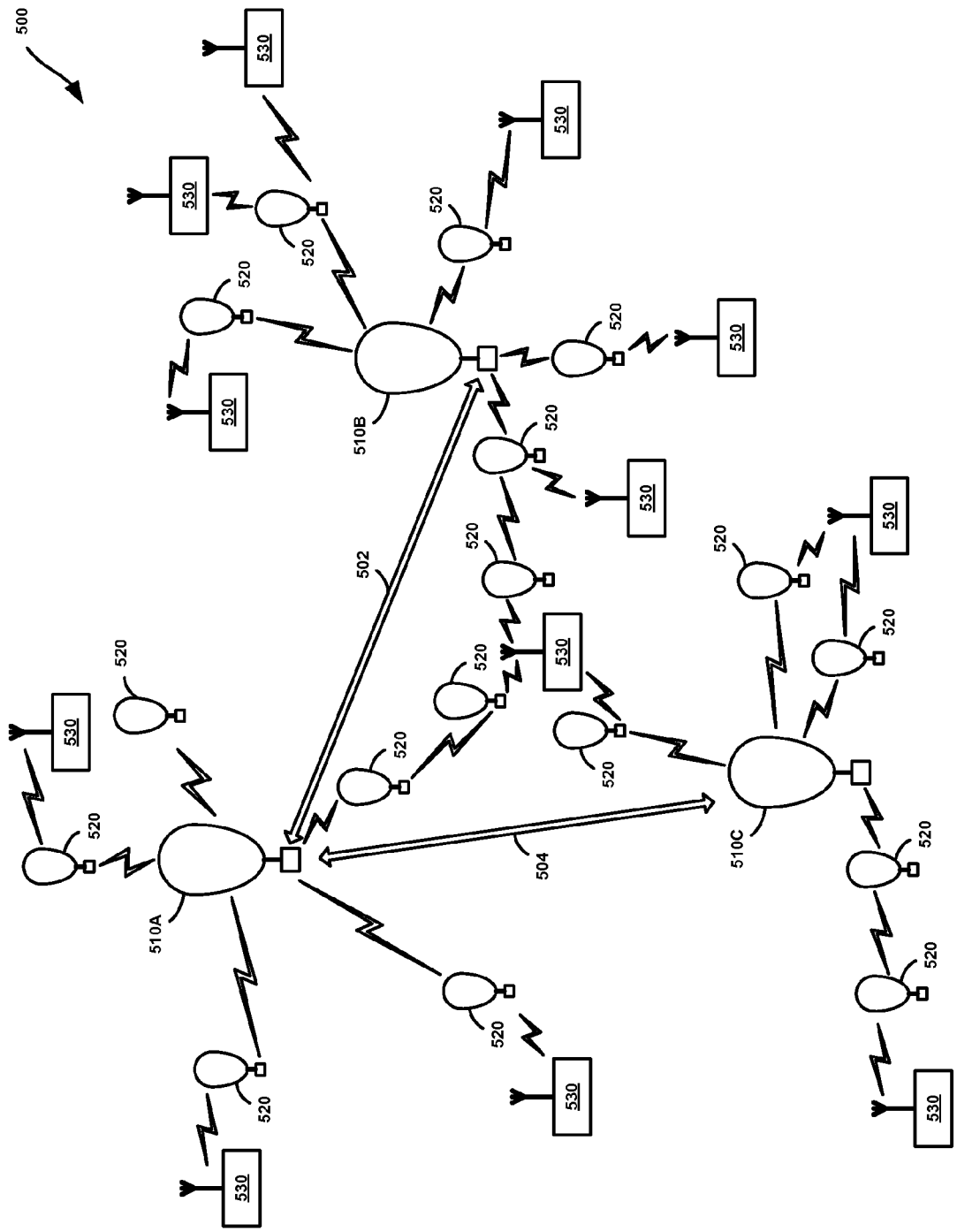
FIG. 5 is a simplified block diagram illustrating a balloon network that includes super-nodes and sub-nodes, according to an example embodiment.

FIG. 5 is a simplified block diagram illustrating a balloon network that includes super-nodes and sub-nodes, according to an example embodiment. More specifically, FIG. 5 illustrates a portion of a balloon network 500 that includes super-node balloons 510A to 510C (which may also be referred to as "super-nodes") and sub-node balloons 520 (which may also be referred to as "sub-nodes").

Each super-node balloon 510A to 510C may include a free-space optical communication system that is operable for packet-data communication with other super-node balloons. As such, super-nodes may communicate with one another over optical links. For example, in the illustrated embodiment, super-node 510A and super-node 501B may communicate with one another over optical link 502, and super-node 510A and super-node 501C may communicate with one another over optical link 504.

Each of the sub-node balloons 520 may include a radio-frequency (RF) communication system that is operable for packet-data communication over one or more RF air interfaces. Accordingly, each super-node balloon 510A to 510C may include an RF communication system that is operable to route packet data to one or more nearby sub-node balloons 520. When a sub-node 520 receives packet data from a super-node 510, the sub-node 520 may use its RF communication system to route the packet data to a ground-based station 530 via an RF air interface.

As noted above, the super-nodes 510A to 510C may be configured for both longer-range optical communication with other super-nodes and shorter-range RF communications with nearby sub-nodes 520. For example, super-nodes 510A to 510C may use high-power or ultra-bright LEDs to transmit optical signals over optical links 502, 504, which may extend for as much as 100 miles, or possibly more. Configured as such, the super-nodes 510A to 510C may be capable of optical communications at speeds of 10 to 50 GB/sec or more.

A larger number of balloons may be configured as sub-nodes, which may communicate with ground-based Internet nodes at speeds on the order of approximately 10 MB/sec. Configured as such, the sub-nodes 520 may be configured to connect the super-nodes 510 to other networks and/or to client devices.

Note that the data speeds and link distances described in the above example and elsewhere herein are provided for illustrative purposes and should not be considered limiting; other data speeds and link distances are possible.

In some embodiments, the super-nodes 510A to 510C may function as a core network, while the sub-nodes 520 function as one or more access networks to the core network. In such an embodiment, some or all of the sub-nodes 520 may also function as gateways to the balloon network 500. Additionally or alternatively, some or all of ground-based stations 530 may function as gateways to the balloon network 500.

4. Examples of a Combined Shipping Container and Balloon Launch System

As noted above, an example system may provide a combined shipping container with an integrated balloon deployment system. Such a shipping container may allow one or more balloons to be transported to a desired launch location, and then launched directly from the shipping container.

Figure 6A:
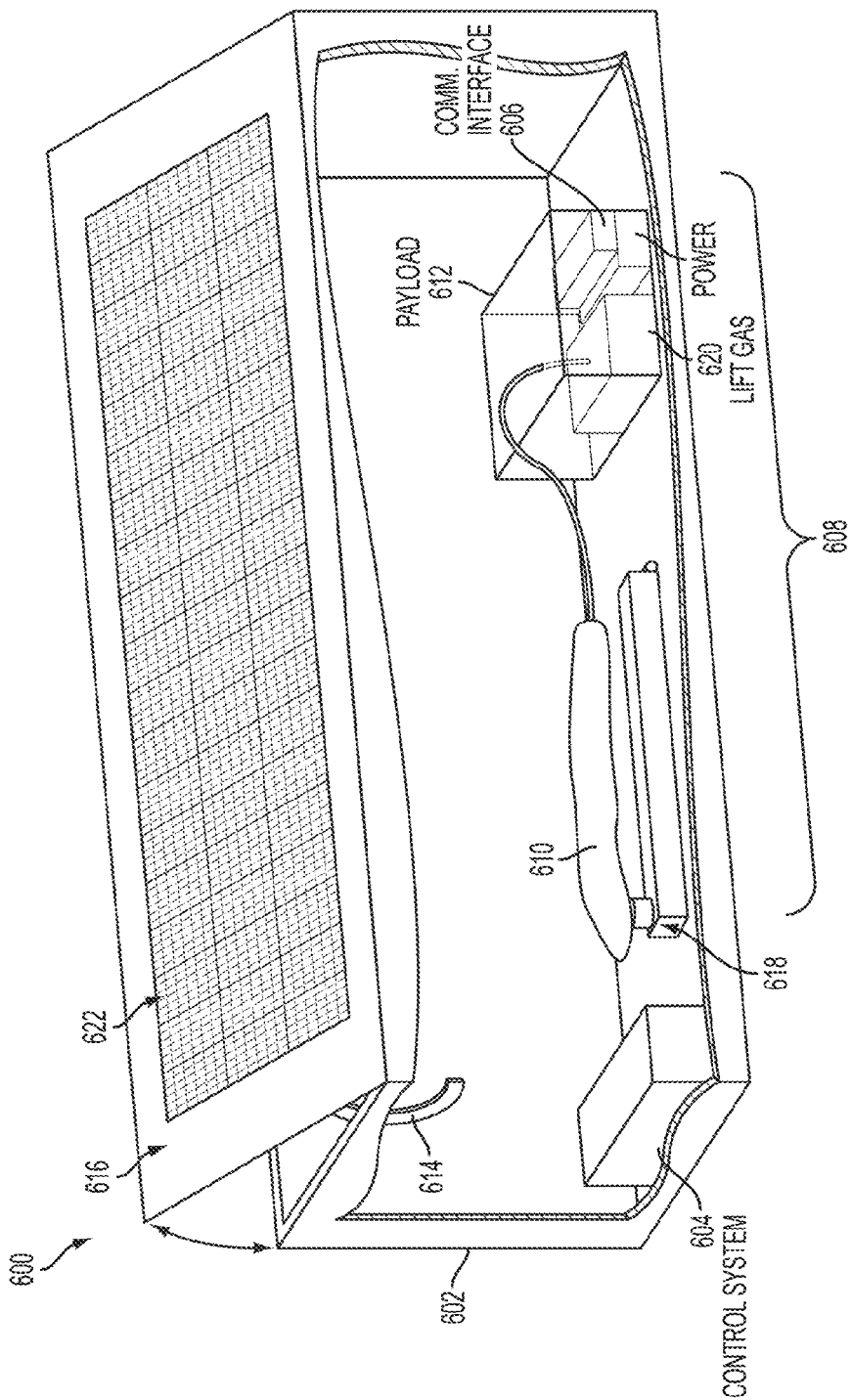
FIG. 6A is a simplified illustration of a system, according to an example embodiment.

FIG. 6A is a simplified illustration of system 600, according to an example embodiment. More specifically, system 600 includes a shipping container 602, a control system 604, a communication interface 606, and a balloon 608 that includes an envelope 610 and a payload 612. Configured as such, system 600 may receive a launch instruction via communication interface 606. Control system 604 may then respond to the launch instruction by operating a balloon-deployment system to open the shipping container 602 launch the balloon from the open shipping container.

In the illustrated embodiment, shipping container 602 is closable to enclose balloon 608. In particular, the balloon deployment system includes a powered hinge 614 that is operable to open the lid 616 of shipping container 602. Accordingly, when it is time to launch the balloon (or at another designated time), control system 604 may operate the powered hinge 614 to open lid 616, thus creating an opening via which balloon 608 can be deployed. Note that in other embodiments, different mechanisms may be employed to automatically open a shipping container so that the balloon or balloons in the shipping container can be deployed. Further, in some embodiments, a shipping container may not have a top section, or might have a partial top section, such that the balloon or balloons in the shipping container can be launched without opening a lid or other such top section.

Figure 6B:
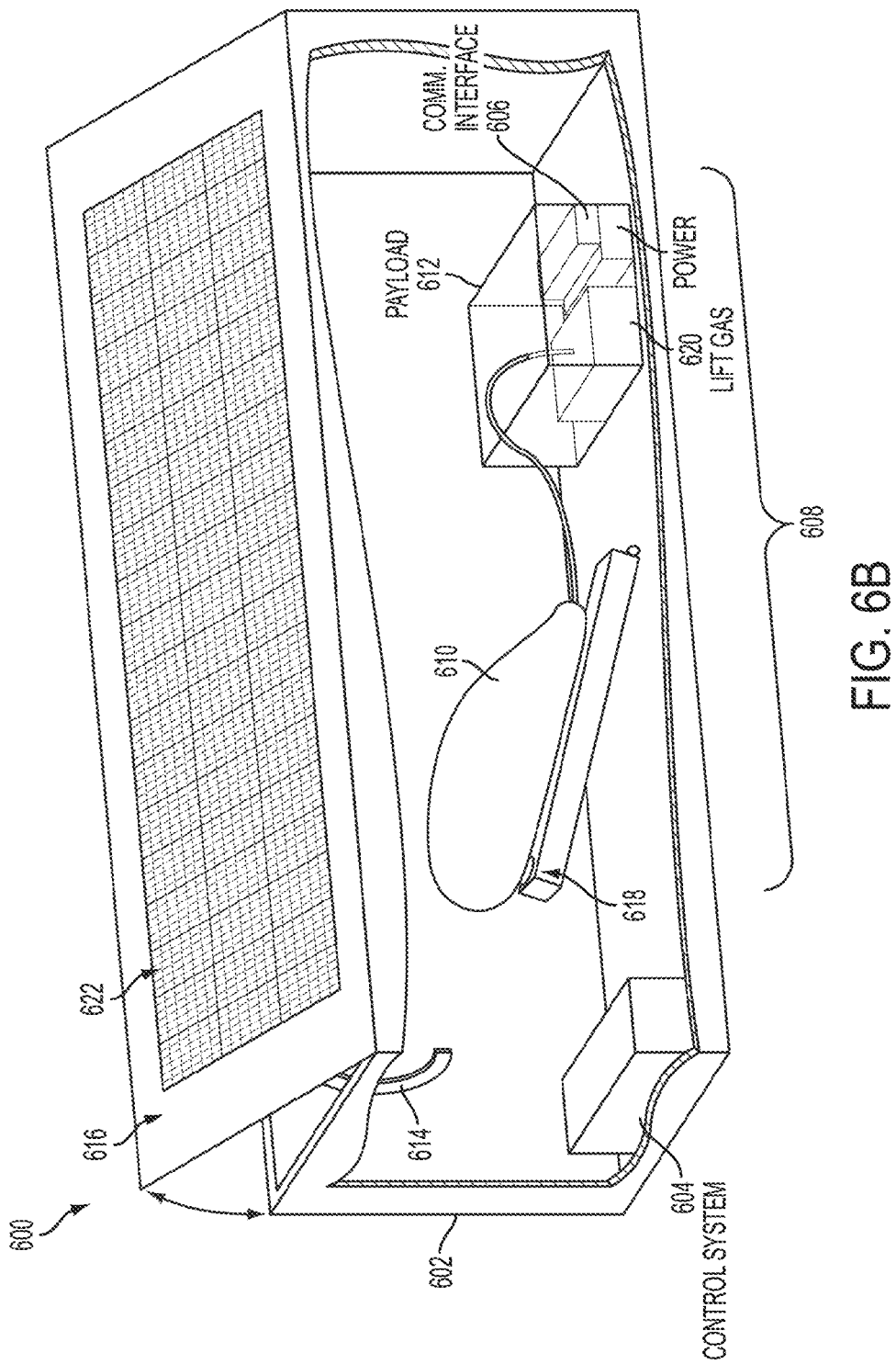
FIG. 6B is another illustration of the system shown in FIG. 6A, which shows the balloon deployment system holding the envelope in a fillable position.

In an example embodiment, the balloon-deployment system may include a mechanical system for automatically positioning and holding the envelope of the balloon in a fillable position. For example, shipping container 602 includes actuators 618 to raise envelope 610 into a position where it can be filled with lift gas. For example, FIG. 6B is another illustration of system 600 shown in FIG. 6A, which shows the balloon deployment system holding envelope 610 in a fillable position. In particular, actuators 618, which are releaseably attached to envelope 610, have positioned envelope over an outlet of lift-gas storage container 620. As such, the outlet of lift-gas storage container 620 may be opened in order to allow lift gas to flow into envelope 610. (Note that lift gas could also be pumped into the envelope.)

In an example embodiment, communication interface 606 is configured for wireless communications under one or more wireless communication protocols. Various types of wireless communication protocols may be utilized, such as using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-to-ground RF communication, among other possibilities. Additionally or alternatively, communication interface 606 could be a free-space optical communication system.

Communication interface 606 may be integrated as part of the balloon (e.g., as a component of payload 612) or as a component of the system that is separate from the balloon. For example, a shipping container could include a separate wireless communication system, which may or may not be in communication with the wireless communication system or systems of the balloon.

In some embodiments, communication interface 606 may be configured for free-space optical and/or RF communications with a balloon network. As such, shipping container 602 may be configured to operate as a ground-based station, in a manner described in reference to ground-based stations 206, 212, or 530, for instance. In particular, before shipping container 602 is deployed, a wireless communication system in payload 612 could allow the shipping container 602 to operate as a ground-based station in a balloon network until the balloon is deployed. Further, when a shipping container includes a stand-alone wireless communication system, the shipping container could operate as ground-based station in a balloon network, even after its balloon have been deployed. As such, a shipping container may ultimately be used to add a ground-based station to the balloon network, in addition to the balloon or balloons that are launched from the shipping container.

Further, while it may be desirable for a shipping container to include wireless communication capabilities in order to receive a launch instruction and/or for other purposes, embodiments with no communication interface are also possible. For example, a control system in a shipping container (which may or may not be part of the balloon) may be configured to detect a launch event, and responsively deploy the balloon from the shipping container for operation in a balloon network. In such an embodiment, various types of launch events are possible.

As an example of a launch event, a control system could determine when the current time is equal to a predetermined launch time. In such an embodiment, a shipping container's control system could be pre-programmed with a specific time in the future at which the shipping container should initiate the deployment process to deploy its balloon. Such programming may be completed before the balloon is shipped. As such, the balloon's shipping container can then be transported to a desired location and left there until it automatically deploys at the pre-programmed time.

As another example of a launch event, a control system could periodically receive data indicating network status of the balloon network, and analyze the received data to detect when an abnormal network status of the balloon network exists. The detection of an abnormal network status may accordingly be considered a launch event. The data that is indicative of network status may simply be a beacon or pilot signal that is transmitted by balloons that are already deployed, which indicates there presence over the geographic area in which the shipping container is located. Additionally, the received data might provide more details about the status of the balloon network, such as the current network usage, available bandwidth, services that are available, and/or the transmitting balloon's connectivity status with other balloons in the balloon network, among other possibilities.

Note that while FIGS. 6A and 6B show a shipping container 602 with a single balloon, a shipping container could include multiple balloons. Further, in an embodiment where a shipping container includes multiple balloons, some or all components of the balloon-deployment system may be used to launch multiple balloons. For instance, a shipping container may include a combined control system that is operable to respond to launch instructions for multiple balloons by causing one or more balloon-deployment systems to launch the each balloon for which a launch instruction is received.

Further, when a shipping container includes multiple balloons, the shipping container may include a single balloon deployment system for all balloons or a separate balloon deployment system for each balloon. In a single-deployment-system configuration, a shipping container may include mechanical features for moving each balloon into position for launch.

It should be understood that the size of a shipping container, such as shipping container 602, may vary according to the particular implementation. As noted above and illustrated in FIGS. 1A and 1B, an example shipping container may be of the same size as a standard sized 20-foot or 40-foot shipping container that is utilized in existing shipping infrastructure. In an example embodiment, such large shipping containers may include multiple balloons. However, embodiments where a 20-foot or 40-foot shipping container is configured to transport and launch a single balloon are also possible.

Shipping containers of other sizes are also possible. For instance, some embodiments may utilize a smaller-sized shipping container that could be shipped as a package via a private or public postal service, for example. Further, shipping containers may be sized accordingly to the systems and balloon or balloons contained therein. Thus, as the size of, e.g., balloons, deployment systems, and/or other systems contained in the shipping container, is reduced, the size of shipping containers may be reduced accordingly. (Similarly, as such reductions in size are made possible, more balloons and/or systems may be included in a given size of shipping container.

5. Power Systems for Combined Shipping Container and Balloon Deployment System

In an example embodiment, a shipping container 602 may include various types of power systems. In particular, the shipping container 602 may include one or more power systems that allow for the components of the shipping container to operate at a remote location until the shipping container deploys its balloon. Further, in some embodiments, the power system or systems may allow for some or all components of the shipping container to operate after it deploys all its balloons.

In the embodiment illustrated in FIGS. 6A and 6B, the shipping container includes a solar power system. In particular, the lid 616 of shipping container 602 includes solar panels 622. As such, when the shipping container 602 is closed, the solar panels 622 may be used to generate some or all of the power to operate, e.g., communication interface 606 and/or the components of the balloon-deployment system.

Further, in other embodiments, solar panels may be moveable so as to help improve the efficiency of the solar power system. For example, solar panels 622 could be mechanically raised above lid 616 so as to create space between the shipping container 602 and the solar panels 622. The solar panels 622 could then be rotated so as to follow and more directly face the sun during the course of a day. Other examples of moveable solar panels are also possible.

Figure 7:
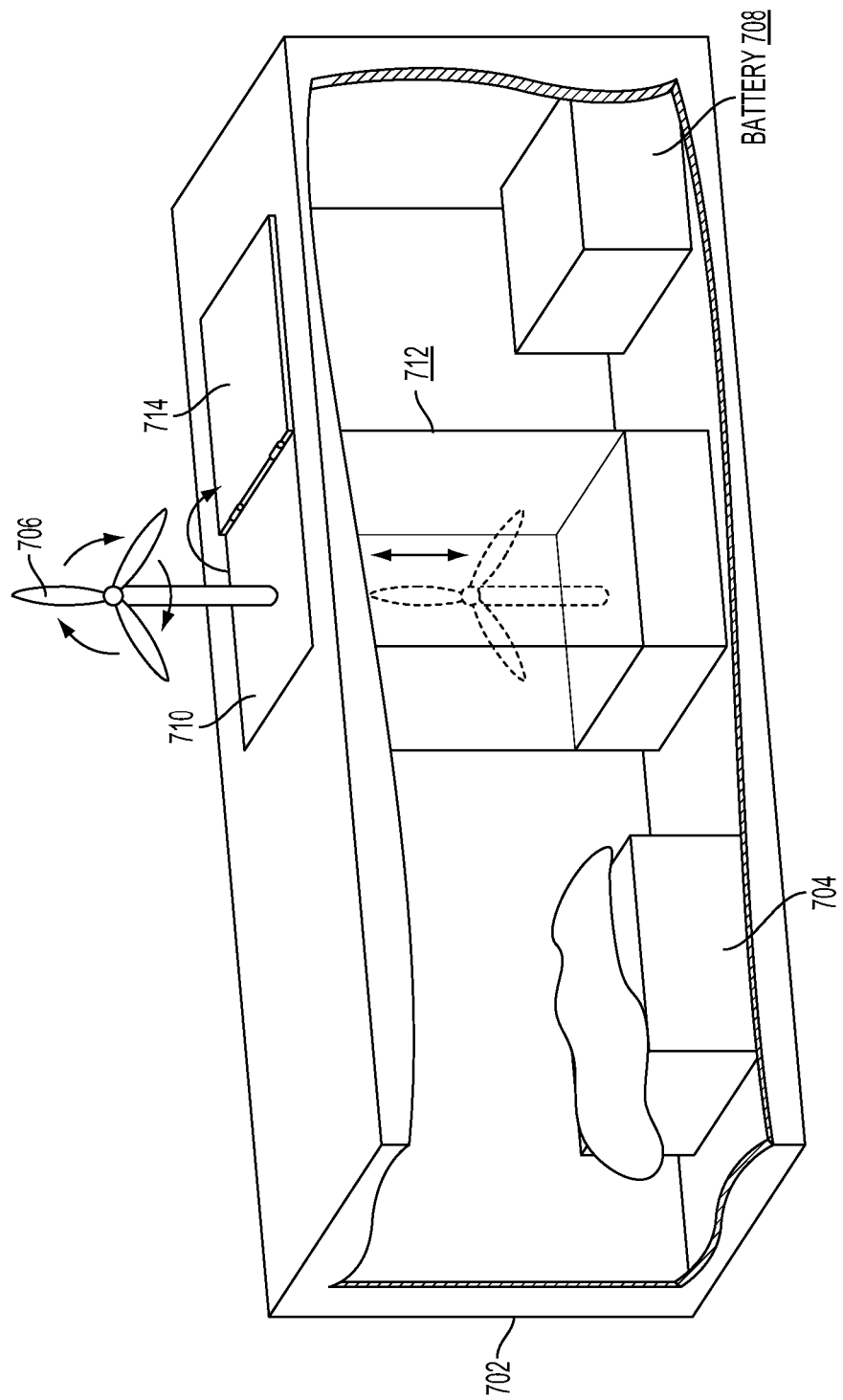
FIG. 7 is a simplified illustration of a shipping container for a balloon, which includes a wind power generation system, according to an example embodiment.

In some embodiments, the shipping container may include a wind power system. For example, FIG. 7 is a simplified illustration of a shipping container 702 for a balloon 704, which includes a wind power generation system, according to an example embodiment. In particular, shipping container 702 includes a wind turbine 706 and a re-chargeable battery 708, which can be charged by the wind turbine 706. Further, note that for purposes of simplification, FIG. 7 does not show many possible components of a combined shipping container and balloon deployment system. However, shipping container 702 may include some or all of the components of the system shown in FIG. 6, and/or may include other components as well.

In the illustrated embodiment, the top section of shipping container 702 includes a hatch 714 that can be opened in order to create an opening in the top section. As such, wind turbine 706 can be stored within the shipping container 702 during transport to the launch location, as represented by the dotted outline of wind turbine 706 within shipping container 702. Then, upon arriving at the launch location, hatch 714 may be manually or automatically opened, opened, and wind turbine 706 may be raised up through the opening, to the position of wind turbine 706, in order to generate power. More specifically, actuators 712 may be operable to raise and/or lower a platform 710 to which wind turbine 706 is attached.

Note that FIG. 7 illustrates one of many possible configurations for a wind power system. For example, while FIG. 7 shows just one wind turbine 706, other embodiments may include multiple wind turbines and/or other types of wind turbines. Further, while a wind turbine or other mechanism for harnessing wind energy may generally be configured to be stored inside the shipping container during transport, and moved into a position such that is exposed to the wind when power is required, the particular mechanical features that allow such functionality may vary, depending upon the implementation. Other variations and modifications to the illustrated wind power system are also possible.

6. Self-Contained Lift-Gas Production System

In a further aspect, a combined shipping container and balloon deployment system may include a self-contained lift-gas production system. In such an embodiment, a balloon may be deployed using hydrogen as a lift gas. The shipping container may then include a water storage container and an electrolysis system for producing the hydrogen gas via electrolysis of the water stored in the water storage container. Further, the electrolysis can be carried out after the shipping container has been transported to the desired location at which deployment of the balloon is desired. Such a configuration may be beneficial, since shipping compressed gas can be costly. Yet further, a shipping container may also include a rain collection system, which may allow it to collect rain water for electrolysis once the container arrives at a desired launch location. Collecting rain water after arriving at the launch location may further reduce shipping costs.

Figure 8:
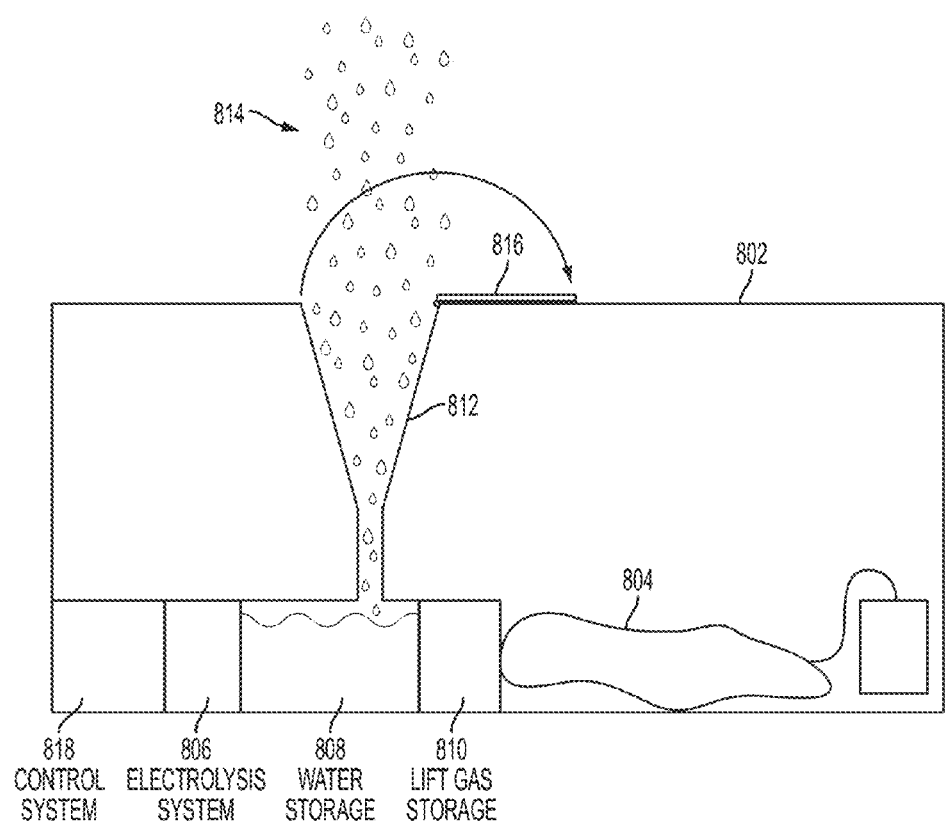
FIG. 8 is a simplified illustration of a shipping container for a balloon, which includes a self-contained lift-gas production system, according to an example embodiment.

FIG. 8 is a simplified illustration of a shipping container 802 for a balloon 804, which includes a self-contained lift-gas production system, according to an example embodiment. More specifically, the self-contained lift-gas production system of shipping container 802 includes a electrolysis system 806, water storage container 808, and a lift-gas storage container 810. Further, a funnel feature 812 is arranged to channel rain water 814 into the water storage container 808.

In some embodiments, a hatch 816 may be closed during transport to cover the opening to funnel feature 812, and prevent rain water from entering the funnel feature. Control system 818 may then be configured to automatically open hatch 816 at a certain time, such as when shipping container 802 arrives at the location where the balloon is to be deployed. Note that mechanisms for opening up and closing off funnel feature 812, other than hatch 816, are also possible. Further, in some embodiments, a rain collection system may not include any mechanism for closing off a funnel feature or other such rain collection features. Yet further, it should be understood that funnel feature 812 is but one example of a rain collection feature. Various other features or combinations of features may be arranged to fill a water storage container in a shipping container for a balloon.

In a further aspect, control system 818 may be configured to intelligently open up and close off funnel feature 812 (e.g., by opening and closing hatch 816), in an effort to more efficiently collect and store rain water. For example, the control system 818 could receive data from a moisture sensor (not shown) located on an exterior surface of shipping container 802. Control system 818 may then open hatch 816 when moisture (e.g., rain) is detected, and close hatch 818 when moisture is not detected for a certain period of time. Additionally or alternatively, control system 818 could receive weather data via a wireless communication interface (not shown in FIG. 8). Control system 818 could then open and close hatch 816 based on current and/or future weather data, in an effort to open the hatch when it is raining and close the hatch when it is not. By opening hatch 816 when it is raining and closing the hatch when it is not, the control system 818 may collect rain water in water storage container 818, while preventing evaporation from the water storage container 818 that might occur if hatch 816 were left open to the environment when it is not raining Note that lift-gas storage container 810 may be integrated as part of the balloon's payload, or could be a separate container within the shipping container 802. In a configuration where lift-gas storage container 810 is separate from a balloon payload, the balloon or balloons in the shipping container may each include a lift-gas storage container. Further, shipping container 802 may include systems (e.g., piping and/or gas pumps) for transferring gas from the separate lift-gas storage container 810 to the lift-gas storage containers in the payloads of the balloons.

7. Conclusion

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system comprising:
    a shipping container that is closable to enclose a plurality of balloons, wherein each balloon comprises an envelope and a payload;
    a communication interface that is operable to receive a launch instruction for each of the plurality of balloons;
    one or more balloon-deployment systems coupled to the shipping container, wherein at least one balloon-deployment system is operable to open the shipping container for deployment of one or more of the balloons, and wherein each balloon deployment system is operable to deploy one or more of the balloons while the shipping container is open; and
    a control system coupled to the shipping container, wherein the control system is operable to respond to the respective launch instruction for each of the plurality of balloons by causing the balloon-deployment system to open the shipping container and launch the balloon for which the launch instruction was received from the open shipping container;
    wherein the shipping container further comprises (i) a water storage container, (ii) a rain collection system arranged to fill the water storage container, (iii) an electrolysis system that is operable to generate hydrogen lift gas from water stored in the water storage container, wherein the electrolysis system is configured to provide the generated hydrogen lift gas to the balloon.

2. The system of claim 1, wherein at least one balloon-deployment system comprises a mechanical system for positioning and holding the envelope of the balloon in a fillable position.

3. The system of claim 1, further comprising a wireless communication interface coupled to the shipping container, wherein the wireless communication interface is operable to receive a launch instruction.

4. The system of claim 3, wherein the wireless communication interface is operable to communicate with a balloon network comprising a plurality of balloons.

5. The system of claim 1, wherein the shipping container further comprises a ground-based communication system configured to communicate with a balloon network.

6. The system of claim 1:
    wherein at least one of the one or more balloon-deployment systems is operable to autonomously and separately launch each of the plurality of balloons;
    wherein, after being deployed, the balloon is not physically tethered to the shipping container; and
    wherein the control system is further configured to: (a) analyze data indicating network functions of the balloon network to detect an abnormal network status of the balloon network, and (b) respond to detection of the abnormal network status by operating the balloon-deployment system to deploy at least one of the balloons from the shipping container for operation in the balloon network.

7. The system of claim 1, wherein the shipping container further comprises a solar power system.

8. The system of claim 7, wherein the solar power system is moveable to more directly face the sun.

9. The system of claim 1, wherein the shipping container further comprises a wind power system.

10. The system of claim 1, further comprising a lift-gas storage container, wherein the lift-gas storage container is enclosed in the shipping container when the shipping container is closed.

11. The system of claim 10, wherein the lift-gas storage container contains hydrogen gas.

12. The system of claim 1, wherein the shipping container further comprises a ground-based communication system configured to communicate with a balloon network.

13. The system of claim 1, wherein the shipping container further comprises a solar power system.

14. A system comprising:
    a shipping container that is closable to enclose a plurality of balloons, wherein each balloon comprises an envelope and a payload;
    one or more balloon-deployment systems coupled to the shipping container, wherein at least one balloon-deployment system is operable to deploy the balloon; and
    a control system coupled to the shipping container, wherein the control system is operable to respond to a respective launch instruction for each of the plurality of balloons by causing balloon-deployment system to launch the respective balloon from the shipping container for operation in a balloon network;
    wherein the shipping container further comprises (i) a water storage container, (ii) a rain collection system arranged to fill the water storage container, (iii) an electrolysis system that is operable to generate hydrogen lift gas from water stored in the water storage container, wherein the electrolysis system is configured to provide the generated hydrogen lift gas to the balloon.

15. The system of claim 14, further comprising a communication interface that is operable to receive a launch instruction.

16. The system of claim 14, wherein the control system comprises a combined control system that is operable to respond to a launch instruction for each of a plurality of balloons by causing the balloon-deployment system to launch the balloon for which the launch instruction was received from the shipping container.

17. The system of claim 14:
    wherein at least one of the one or more balloon-deployment systems is operable to autonomously and separately launch each of the plurality of balloons;
    wherein, after being deployed, the balloon is not physically tethered to the shipping container; and
    wherein the control system is further configured to: (a) analyze data indicating network functions of the balloon network to detect an abnormal network status of the balloon network, and (b) respond to detection of the abnormal network status by operating the balloon-deployment system to deploy at least one of the balloons from the shipping container for operation in the balloon network.

18. A system comprising:
    a shipping container that is closable to enclose a plurality of balloons, wherein each balloon comprises an envelope and a payload;

one or more balloon-deployment systems coupled to the shipping container, wherein each balloon-deployment system is operable to deploy one or more of the balloons; and a control system coupled to the shipping container, wherein the control system is operable to:
  detect a launch event corresponding to a particular one or more of the plurality of balloons; and
  in response to detection of the launch event, operate at least one balloon-deployment system to deploy the particular one or more balloons from the shipping container for operation in a balloon network;

wherein the shipping container further comprises (i) a water storage container, (ii) a rain collection system arranged to fill the water storage container, (iii) an electrolysis system that is operable to generate hydrogen lift gas from water stored in the water storage container, wherein the electrolysis system is configured to provide the generated hydrogen lift gas to the balloon.

19. The system of claim 18, wherein the launch event comprises determining that a current time is equal to a predetermined launch time.

20. A system of claim 18, wherein the control system is further configured to:
  periodically receive the data indicating network functions of the balloon network;
  wherein the launch event comprises detection of the abnormal network status.

21. The system of claim 18:
wherein at least one of the one or more balloon-deployment systems is operable to autonomously and separately launch each of the plurality of balloons;
wherein, after being deployed, the balloon is not physically tethered to the shipping container; and
wherein the control system is further configured to: (a) analyze data indicating network functions of the balloon network to detect an abnormal network status of the balloon network, and (b) respond to detection of the abnormal network status by operating the balloon-deployment system to deploy at least one of the balloons from shipping container for operation in the balloon network.

* * * * *